(12) United States Patent
Mehrabi et al.

(10) Patent No.: US 10,569,479 B2
(45) Date of Patent: Feb. 25, 2020

(54) SYSTEMS AND METHODS FOR MAKING POROUS FILMS, FIBERS, SPHERES, AND OTHER ARTICLES

(71) Applicant: Vertera, Inc., Atlanta, GA (US)

(72) Inventors: Ali R. Mehrabi, Glendale, CA (US); Reza Mehrabi, Glendale, CA (US); Rishikesh K. Bharadwaj, Glendale, CA (US); Eugene Rozenbaoum, Glendale, CA (US); Frank Chica, Glendale, CA (US)

(73) Assignee: Vertera, Inc., Atlanta, GA (US)

( * ) Notice: Subject to any disclaimer, the term of this patent is extended or adjusted under 35 U.S.C. 154(b) by 687 days.

(21) Appl. No.: 14/422,570

(22) PCT Filed: Aug. 20, 2013

(86) PCT No.: PCT/US2013/055656
§ 371 (c)(1),
(2) Date: Feb. 19, 2015

(87) PCT Pub. No.: WO2014/031565
PCT Pub. Date: Feb. 27, 2014

(65) Prior Publication Data
US 2015/0231833 A1  Aug. 20, 2015

Related U.S. Application Data

(60) Provisional application No. 61/691,506, filed on Aug. 21, 2012.

(51) Int. Cl.
*B29C 67/20* (2006.01)
*B29C 39/14* (2006.01)
*B05C 19/00* (2006.01)

(52) U.S. Cl.
CPC ............ *B29C 67/202* (2013.01); *B05C 19/00* (2013.01); *B29C 39/14* (2013.01); *Y10T 428/139* (2015.01);
(Continued)

(58) Field of Classification Search
USPC ............ 118/308, 303, 612; 427/180; 264/49
See application file for complete search history.

(56) References Cited

U.S. PATENT DOCUMENTS

| 699,026 A | 4/1902 | Shaler |
| 1,977,321 A | 10/1934 | Merritt et al. |

(Continued)

FOREIGN PATENT DOCUMENTS

| CN | 1617669 | 5/2005 |
| CN | 101107127 | 1/2008 |

(Continued)

OTHER PUBLICATIONS

International Search Report and Written Opinion dated Mar. 5, 2014 issued in corresponding International Application No. PCT/US2013/055656 filed Aug. 20, 2013.
(Continued)

*Primary Examiner* — Yewebdar T Tadesse

(57) ABSTRACT

Multiple processes for preparing porous articles are described. The porous articles can be in a wide array of shapes and configurations. The methods include providing a soluble material in particulate form and forming a packed region from the material. The methods also include contacting a flowable polymeric material with the packed region such that the polymeric material is disposed in voids in the packed region. The polymeric material is then at least partially solidified. The soluble material is then removed (Continued)

such as by solvent washing to thereby produce desired porous articles. Also described are systems for performing the various processes.

4 Claims, 13 Drawing Sheets

(52) U.S. Cl.
CPC .... *Y10T 428/2975* (2015.01); *Y10T 428/2982* (2015.01)

(56) References Cited

U.S. PATENT DOCUMENTS

| | | | |
|---|---|---|---|
| 1,999,903 | A | 4/1935 | Harshberger |
| 2,984,869 | A | 5/1961 | O'Conor et al. |
| 3,170,604 | A | 2/1965 | Chapman |
| 3,426,730 | A * | 2/1969 | Lawson et al. ......... B05B 5/057 |
| | | | 118/308 |
| 3,485,207 | A | 12/1969 | Gerlovich |
| 3,524,753 | A | 8/1970 | Sharp |
| 3,612,128 | A | 10/1971 | Beck et al. |
| 3,679,538 | A | 7/1972 | Druin et al. |
| 4,008,114 | A | 2/1977 | Lindsey |
| 4,080,928 | A | 3/1978 | Savard, Jr. |
| 4,258,455 | A | 3/1981 | Werner |
| 4,487,731 | A | 12/1984 | Kobayashi |
| 4,644,942 | A | 2/1987 | Sump |
| 4,705,702 | A | 11/1987 | Shimada et al. |
| 4,728,698 | A * | 3/1988 | Isayev .................... C08L 69/00 |
| | | | 264/108 |
| 4,863,604 | A | 9/1989 | Lo et al. |
| 4,892,544 | A | 1/1990 | Frisch |
| 5,277,973 | A | 1/1994 | Yamamura et al. |
| 5,320,907 | A | 6/1994 | Sato |
| 6,060,530 | A | 5/2000 | Chaouk et al. |
| 6,183,873 | B1 | 2/2001 | Clarke |
| 6,261,469 | B1 | 7/2001 | Zakhidov et al. |
| 6,436,506 | B1 | 8/2002 | Pinter et al. |
| 6,517,763 | B1 | 2/2003 | Zakhidov et al. |
| 6,969,897 | B2 | 11/2005 | Kim |
| 7,018,918 | B2 | 3/2006 | Kloster et al. |
| 7,018,920 | B2 | 3/2006 | Meagley et al. |
| 7,153,360 | B2 | 12/2006 | Herman et al. |
| 7,158,709 | B2 | 1/2007 | Hino |
| 7,172,142 | B2 | 2/2007 | Taylor et al. |
| 7,182,019 | B2 | 2/2007 | Cutcher et al. |
| 7,412,767 | B2 | 8/2008 | Kim et al. |
| 7,455,759 | B2 | 11/2008 | Saito et al. |
| 7,575,759 | B2 | 8/2009 | Murphy et al. |
| 8,337,947 | B2 | 12/2012 | Camorani |
| 8,496,116 | B2 | 7/2013 | Carr et al. |
| 2004/0026811 | A1 | 2/2004 | Murphy et al. |
| 2004/0040416 | A1 | 3/2004 | Erlebacher et al. |
| 2004/0138058 | A1 | 7/2004 | Sambasivan |
| 2004/0157436 | A1 | 8/2004 | Wong |
| 2005/0042874 | A1 | 2/2005 | Meagley et al. |
| 2005/0058474 | A1 | 3/2005 | Watanabe et al. |
| 2005/0065260 | A9 | 3/2005 | Kolarik |
| 2005/0160964 | A1 | 7/2005 | Champion et al. |
| 2006/0000373 | A1 | 1/2006 | Stefani |
| 2006/0137601 | A1 | 6/2006 | Miguez et al. |
| 2007/0009572 | A1 | 1/2007 | Mary Chan et al. |
| 2007/0074540 | A1 | 4/2007 | Chen et al. |
| 2007/0273055 | A1 | 11/2007 | Sazio et al. |
| 2007/0275863 | A1 | 11/2007 | Whitmarsh |
| 2007/0282439 | A1 | 12/2007 | Zehbe et al. |
| 2008/0029625 | A1 | 2/2008 | Talton |
| 2008/0038934 | A1 | 2/2008 | Vrtis et al. |
| 2008/0299845 | A1 | 12/2008 | Lewis |
| 2008/0299875 | A1 | 12/2008 | Duescher |
| 2009/0046967 | A1 | 2/2009 | Pope et al. |
| 2010/0048393 | A1 | 2/2010 | Juarez-Zamacona |
| 2010/0256804 | A1 | 10/2010 | Freeman |
| 2011/0177320 | A1 | 7/2011 | Mehrabi et al. |

FOREIGN PATENT DOCUMENTS

| | | |
|---|---|---|
| CN | 101384405 | 2/2011 |
| CN | 201862563 | 6/2011 |
| CN | 101547743 | 7/2012 |
| CN | 101523013 | 9/2013 |
| DE | 138390 | 2/1903 |
| DE | 139622 | 3/1903 |
| DE | 10054089 | 7/2002 |
| DE | 102006014174 | 9/2007 |
| EP | 0512401 | 11/1992 |
| EP | 0634516 | 1/1995 |
| EP | 0700673 | 3/1996 |
| EP | 0714869 | 6/1996 |
| EP | 1162047 | 12/2001 |
| EP | 1136050 | 6/2005 |
| EP | 1714697 | 10/2006 |
| EP | 1471126 | 6/2007 |
| FR | 1171658 | 1/1959 |
| GB | 829811 | 3/1960 |
| GB | 884232 | 12/1961 |
| GB | 1201704 | 8/1970 |
| GB | 1236995 | 6/1971 |
| GB | 1353391 | 5/1974 |
| JP | 50-92972 | 4/1975 |
| JP | 59-129186 | 7/1984 |
| JP | 2003-073497 | 3/2003 |
| WO | 1999/64361 | 12/1999 |
| WO | 00/21905 | 4/2000 |
| WO | 2002/068373 | 9/2002 |
| WO | 03/024626 | 3/2003 |
| WO | 03/057844 | 7/2003 |
| WO | 2003/074227 | 9/2003 |
| WO | 2003/080119 | 10/2003 |
| WO | 2004/020362 | 3/2004 |
| WO | 2004/082333 | 9/2004 |
| WO | 2007/003513 | 1/2007 |
| WO | 2007/090131 | 8/2007 |
| WO | 2007/111997 | 10/2007 |
| WO | 2009/152481 | 12/2009 |
| WO | 2010/101927 | 9/2010 |

OTHER PUBLICATIONS

International Preliminary Report on Patentability dated Mar. 5, 2015 issued in corresponding International Application No. PCT/US2013/055656 filed Aug. 20, 2013.
Invitation to Pay Additional Fees dated Feb. 10, 2014 issued in corresponding International Application No. PCT/US2013/055655 filed Aug. 20, 2013.
International Search Report dated Apr. 15, 2014 issued in corresponding International Application No. PCT/US2013/055655 filed Aug. 20, 2013.
Written Opinion dated Apr. 15, 2014 issued in corresponding International Application No. PCT/US2013/055655 filed Aug. 20, 2013.
International Preliminary Report on Patentability dated Mar. 5, 2015 issued in corresponding International Application No. PCT/US2013/055655 filed Aug. 20, 2013.
International Search Report and Written Opinion for international Application No. PCT/US2009/047285 filed Jun. 12, 2009.
International Preliminary Report on Patentability for International Application No. PCT/US20061047286 filed Jun. 12, 2009.

* cited by examiner

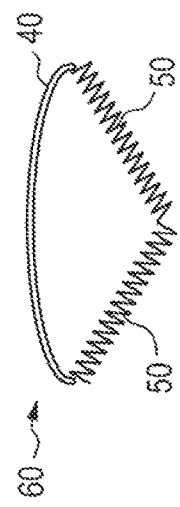
FIG. 1
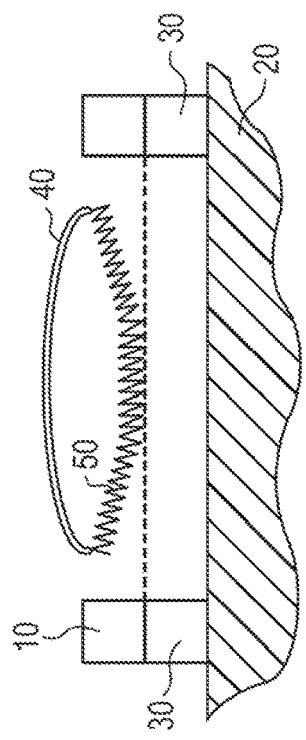
FIG. 3
FIG. 4
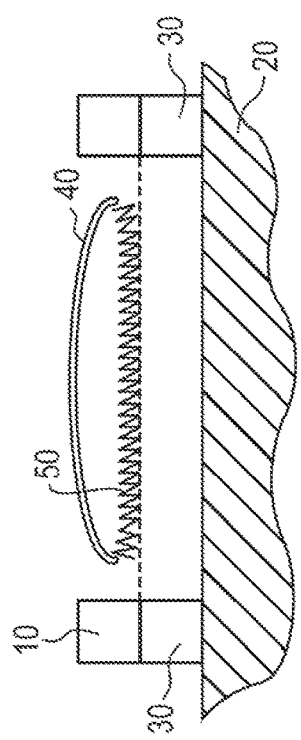
FIG. 5
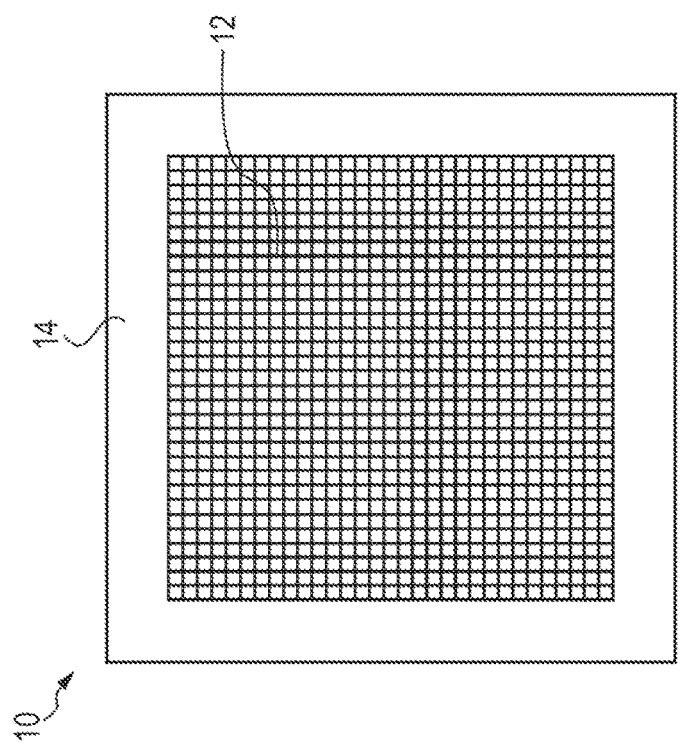
FIG. 2

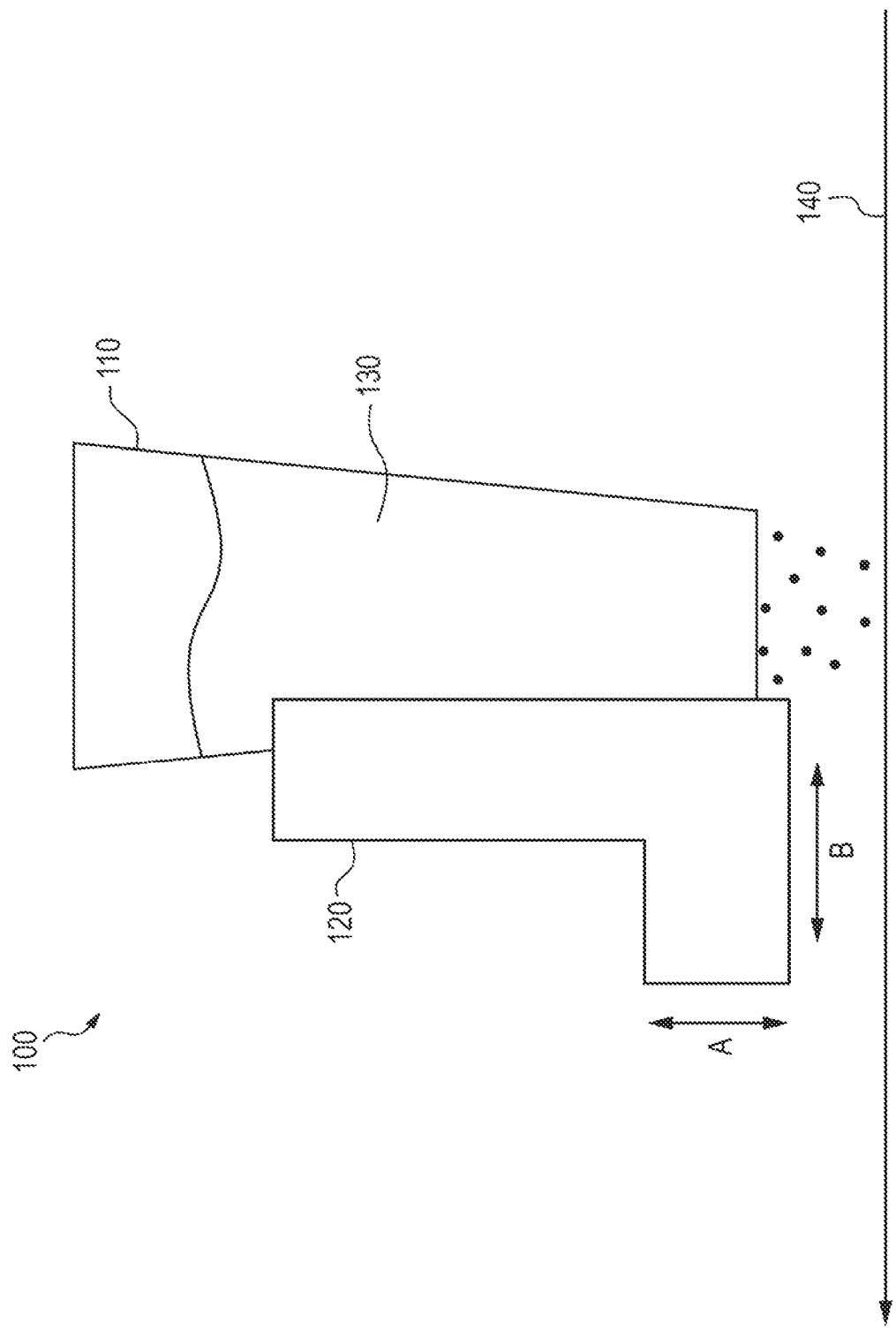

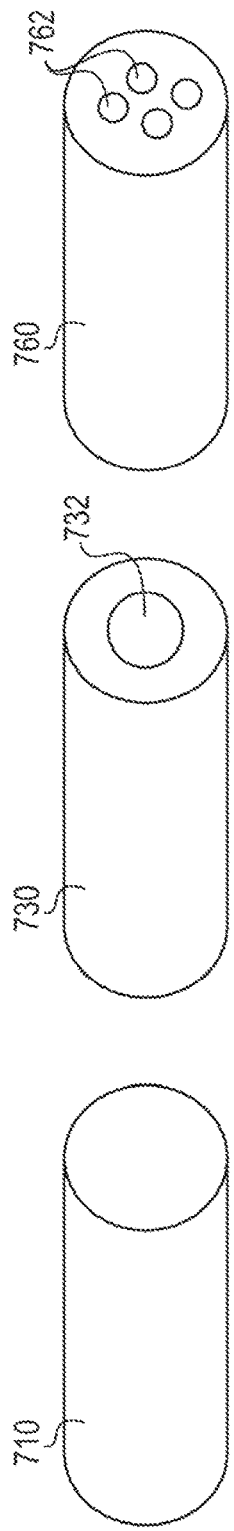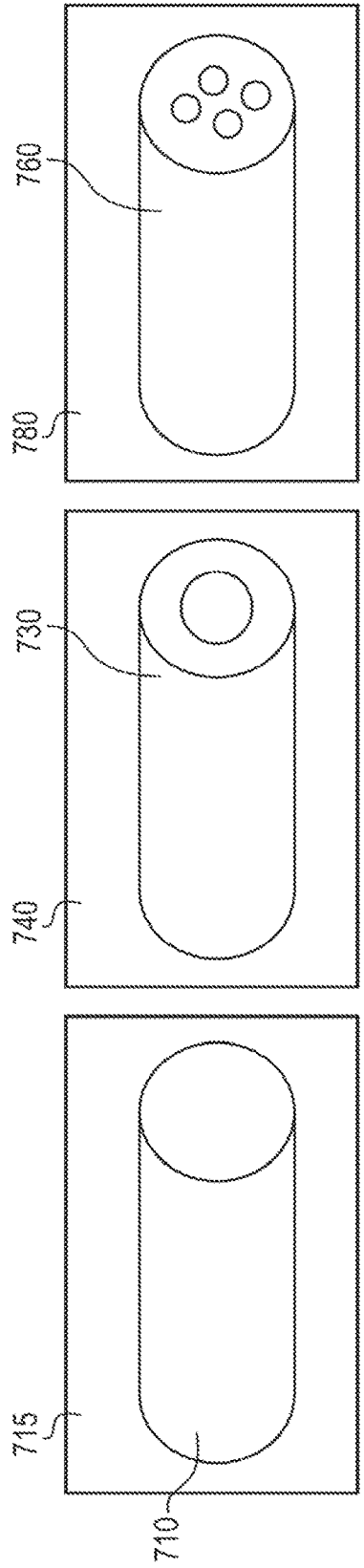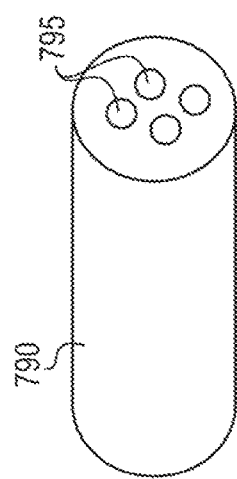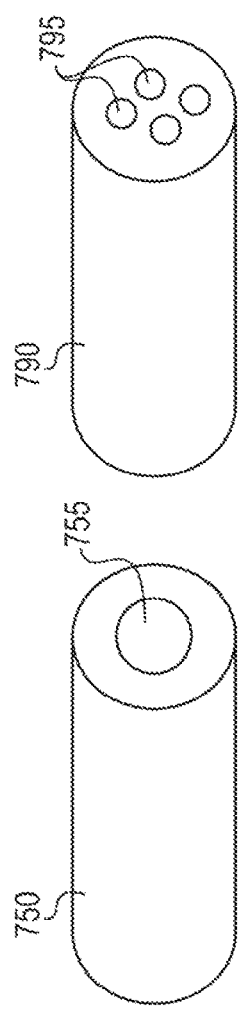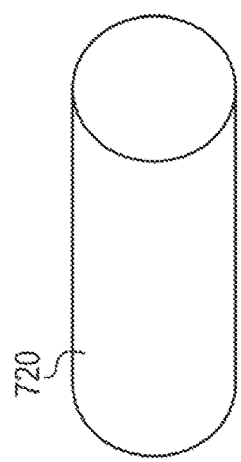
FIG. 13
FIG. 14
FIG. 15
FIG. 16
FIG. 17
FIG. 18
FIG. 19
FIG. 20
FIG. 21

SYSTEMS AND METHODS FOR MAKING POROUS FILMS, FIBERS, SPHERES, AND OTHER ARTICLES

CROSS REFERENCES TO RELATED APPLICATIONS

The present application is a 371 of International Application No. PCT/US2013/055656 which was published in English on Feb. 27, 2014, and claims priority to U.S. Provisional Application No. 61/691,506 filed Aug. 21, 2012, which claims the benefit of and is a continuation-in-part of International Patent Application No. PCT/US2009/047286 filed on Jun. 12, 2009, all of which are incorporated herein by reference in their entireties.

FIELD

The present subject matter relates to systems and methods for forming arrangements of materials and various porous products produced therefrom. In particular, the present subject matter relates to forming porous films, fibers, spheres, and other articles from arrangements of multiple materials.

BACKGROUND

Polymeric materials and films are widely used for various products and/or applications. Polymeric materials and films have a broad range of properties and can be provided at relatively low costs. For example, polymeric surfaces can be functionalized in order to exhibit desired properties for a specific application. Specifically, a polymeric surface can be altered physically and/or chemically in order to improve its printability, filtration performance, adhesion, wettability, weatherability, permeability, optical properties or incorporate specific functional groups.

Several techniques have been previously developed to create micro-structures on and/or in polymeric materials. In particular, techniques have been previously developed to create porous or structured polymeric materials by the formation of pores or other like structures therein. See, e.g., U.S. Pat. No. 3,679,538 to Druin et al., U.S. Pat. No. 4,863,604 to Lo et al., U.S. Pat. No. 4,487,731 to Kobayashi, and U.S. Patent Application Pub. No. 2004/0026811 to Murphy et al., all incorporated in their entirety herein.

However, many prior developed techniques are generally limited in one way or another. For example, some may only work for making porous structures throughout the entire polymer. Thus, there is a lack of control with regard to the extent of the micro-structure and/or pore formation and/or the connectivity therebetween. Additionally, prior developed techniques may be time consuming, complicated and/or not well suited to conventional commercial production processes (e.g., such as roll-to-roll polymer film production) which one may desire to use.

Micro-embossing, photolithography, etching, and laser drilling are among other methods previously developed to generate textured and micro-structures at or on the surface of polymeric materials. While some of these methods are advantageous due to economical and technological issues, they generally lack the ability to efficiently and/or effectively produce certain branched and/or closed loop structures. Additionally, in general, these methods may not be well suited to the production of internal networks of interconnected pores.

Accordingly, new and/or improved micro-structured and/or composite material(s) and/or method(s) for producing the same which address the above-referenced problem(s) and/or others are needed.

SUMMARY

The difficulties and drawbacks associated with previously known practices and materials are addressed in the present systems, methods and resulting materials.

In one aspect, the present subject matter provides a system for dispensing particulates onto a substrate. The system comprises a mesh frame that includes a screen extending between a frame assembly. The screen defines a plurality of apertures. The system also comprises provisions for producing vibratory motion. The provisions are in vibratory communication with the mesh frame. The system additionally comprises at least one spacer positioned between the mesh frame and the substrate on which particulates are to be dispensed. The spacer has dimensions corresponding to the desired thickness of the layer of particulates to be dispensed on the substrate.

In another aspect, the present subject matter provides a method of forming a porous article comprising providing a soluble material in particulate form. The method also comprises forming a packed region of the soluble particulate material having a plurality of voids in the packed region. The method further comprises contacting a flowable polymeric material with at least a portion of the packed region of the soluble particulate material whereby at least a portion of the flowable polymeric material is disposed in at least a portion of the voids in the packed region. The method additionally comprises at least partially solidifying the polymeric material to thereby form an intermediate composite material. And, the method comprises removing at least a portion of the soluble particulate material from the intermediate composite material to thereby form a porous article.

And in other aspects, the present subject matter provides a system for forming a porous article. The system comprises provisions for dispensing a polymeric material. The system also comprises at least one particulate dispensing apparatus configured to selectively dispense a desired amount of particulates in intimate contact with the polymeric material. The system also comprises heating provisions for increasing the temperature of the polymeric material so that the polymeric material flows between particulates to thereby form an intermediate composite material. And, the system comprises washing provisions for dispensing a wash liquid that solubilizes the particulates.

In still additional aspects, the present subject matter provides a porous polymeric film or porous polymeric particulates produced by any of the methods or techniques described herein. The porous polymeric particulates can be in a wide array of shapes, sizes and configurations. In certain versions, the porous particulates are in the form of fibers or tubes, or spheres, or other geometrical shapes. The porous particulates can have non-hollow interiors, a single interior hollow region, and/or multiple interior hollow regions.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIG. 1 is a schematic planar top view of a tensioned mesh member in accordance with the present subject matter.

FIG. 2 is a schematic side elevational view of the tensioned mesh member of FIG. 1.

FIG. 3 is a schematic view of a spring assembly in accordance with the present subject matter.

FIG. 4 is a schematic view of the spring assembly partially contacting a tensioned mesh member in accordance with the present subject matter.

FIG. 5 is a schematic view of the spring assembly in relatively full contact with a tensioned mesh member.

FIG. 6 is a schematic view of a vibrating blade assembly in accordance with the present subject matter.

FIGS. 13-15 are schematic views illustrating formation of porous fibers or tubes in accordance with the present subject matter.

FIGS. 16-18 are schematic views illustrating formation of porous fibers or tubes having an interior hollow region in accordance with the present subject matter.

FIGS. 19-21 are schematic views illustrating formation of porous fibers or tubes having a plurality of interior hollow regions in accordance with the present subject matter.

DETAILED DESCRIPTION OF THE EMBODIMENTS

Figure 7:
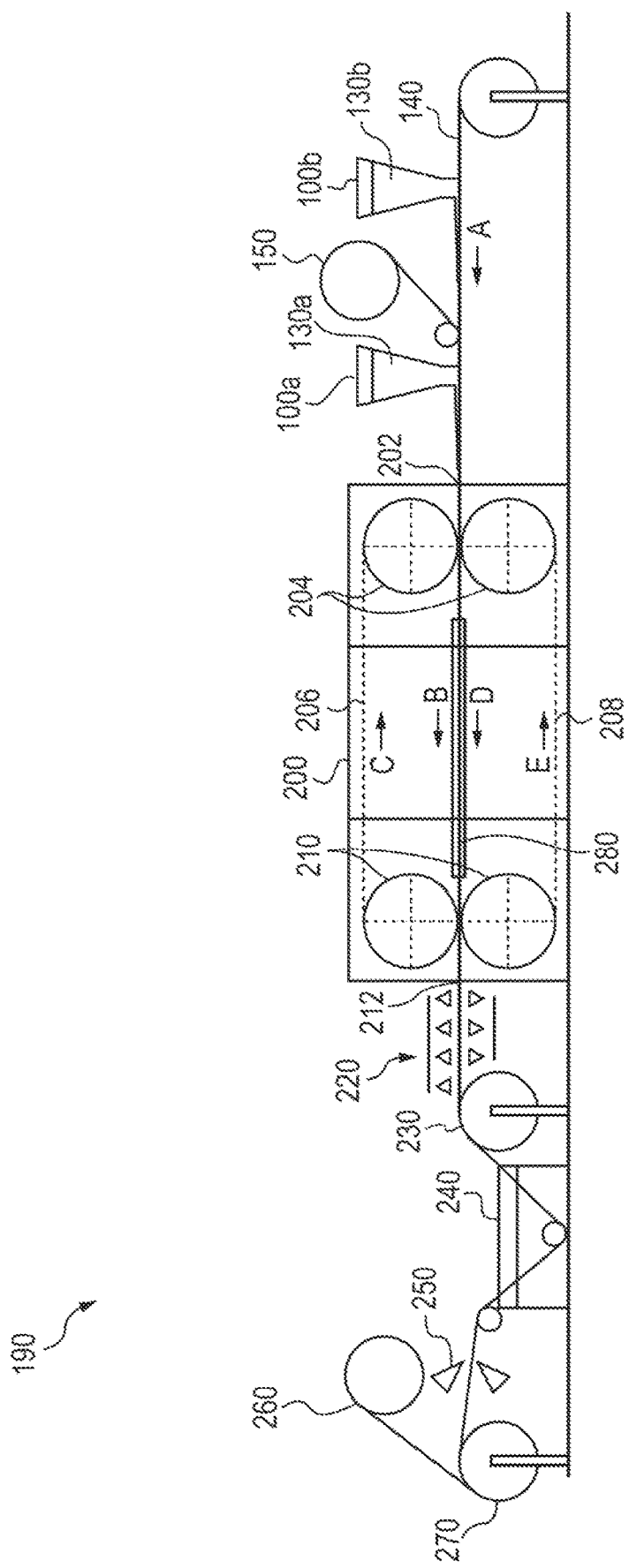
FIG. 7 is a schematic view of a system in accordance with the present subject matter.

Porous articles of polymeric material(s) are used in a wide range of applications. The present subject matter relates to various techniques and methods for producing such porous articles. The subject matter also relates to systems for performing such techniques and/or for producing such porous articles. The methods generally involve forming a layered arrangement of a polymeric material or film and at least one other layer of particulates such as salt, that can be solubilized or otherwise removed upon exposure to a wash liquid. After forming the layered arrangement, the arrangement is subjected to heating and optional increased pressure to cause the polymeric material to flow between particulates. After polymer solidification, the particulates are removed such as by washing. The remaining polymeric material is porous and/or exhibits a microstructured surface.

Various methods for dispensing powders or particulates such as salt are known. In certain applications, it is desired to form a multilayer arrangement of salt and polymeric materials. One method for dispensing salt in a layer is to administer the salt powder onto a mesh screen and, using a vibration source such as a vibrating handheld tool, sieve the salt by dragging the tool over the mesh screen to displace the salt through the screen. A polymer film can then be positioned on the salt and optionally another salt layer can be deposited onto the film. Although this practice can in theory produce a multilayer arrangement of salt and polymeric materials, the resulting layers typically exhibit uneven thickness and differing properties at various locations within the layer.

In accordance with the present subject matter and as shown in FIGS. 1-5, a tensioned mesh frame 10 is positioned on top of a glass sheet or other substrate 20. The mesh frame generally includes a mesh face 12 extending between a frame assembly 14. The mesh face 12 defines a plurality of apertures or openings across the thickness of the mesh, similar to a screen. Spacers 30 are positioned under each corner of the mesh frame assembly 14 to set or otherwise control the thickness of the salt layer or cake. Vibratory provisions are provided to transfer vibratory motion to the mesh frame 10, and in particular to the screen. The vibratory provisions can be in a variety of different forms. However, in most configurations, the vibratory provisions are placed in vibratory communication with the mesh frame such that upon vibration of the provisions, vibratory movement is transferred to the mesh frame 10, and in particular to the screen. In one embodiment, the vibratory provisions can include one or more thin metal bars 40 which are attached to an arched support and/or to a plurality of springs 50. When the resulting spring apparatus 60 is engaged with the mesh frame 10, the springs are tensioned across the mesh screen. Once a sufficient amount of salt powder is placed on the mesh face 12, the spring apparatus 60 is displaced back and forth along the mesh frame 10, preferably contacting the mesh frame 10, and the reciprocating movement or vibration of the springs 50 results in deposition of the salt powder through the mesh face 12 onto a glass sheet or substrate 20. A polymer film is deposited over the salt layer or cake and the process is repeated with potentially larger spacers to deposit a top salt layer if so desired. This system and its use have been found to produce salt layers having layers of uniform thickness and exhibiting similar properties at different locations or regions in the layer(s).

As shown in FIG. 6, in one aspect, a system 100 is provided in which a feeder is 110 engaged to a vibrating blade 120 that oscillates both laterally and in a transverse direction such as vertically. This is another example of vibratory provisions for transferring vibratory motion to the mesh frame 10. The feeder 110 contains particulate material 130. Thus, for example, the vibrating blade may oscillate not only side to side but up and down as well. Thus, the vibrating blade 120 can oscillate in direction A, or in direction B, or in both directions A and B. It is also contemplated that the vibrating blade 120 could also oscillate in a direction (not shown) that is transverse to both directions A and B. The vibrating blade could undergo vibratory motion in one or more of these directions or in combinations of these directions. This system is 100 positioned above a moving belt 140 to dispense the particulate material 130 directly onto the belt 140. It is also contemplated that the system 100 could be utilized in association with the tensioned mesh frame 10 described in FIGS. 1-5. That is, the tensioned mesh frame 10 could be positioned between the system 100 and the moving belt 140 shown in FIG. 6. In such an embodiment, vibratory motion from the vibrating blade 120 is also transferred to the mesh frame 10. In certain applications, a particulate dispensing apparatus described in U.S. Provisional Application No. 61/691,513 filed Aug. 21, 2012, entitled "PARTICULATE DISPENSING APPARATUS", the disclosure of which is incorporated herein by reference in its entirety, can be used for the system 100. Two feeder and blade apparatuses shown as 100a and 100b in FIG. 7 can be coupled to dispense two separate salt layers along a belt, with a polymeric film placed in between.

Specifically, FIG. 7 is a process schematic in accordance with the present subject matter. Referring to FIG. 7, a system 190 is provided comprising a process arrangement which provides a layered material which generally includes one or more layers of particulates disposed along a polymeric film or other thin layer. Two of the previously described systems 100 described in association with FIG. 6 can be used in the process of FIG. 7 and are shown as 100a and 100b. A source of a polymeric film 150 is fed between two layers of particulates 130a and 130b deposited from feeder systems 100a and 100b, all of which are supported and transported on the previously noted moving belt 140.

Referring further to FIG. 7, the layered material arrangement which includes an upper layer of particulate material 130a from feeder system 100a, an intermediate layer of polymeric film 150, and a lower layer of particulate material 130b from feeder system 100b is carried on the moving belt 140 and enters a double belt press 200 at feed entrance 202. The double belt press generally includes a first set of rollers 204 and a second set of rollers 210 downstream from the first set 204. A first belt 206 extends between the rollers 204 and the rollers 210. A second belt 208 also extends between the rollers 204 and the rollers 210 in opposing relationship to at least a portion of the first belt 206. The belts typically are oriented such that the first belt 206 is positioned above the moving belt 140 and the second belt 208 is positioned below the moving belt 140. Each belt 206 and 208 is continuous and configured for its portion proximate the moving belt 140 to travel in the same direction and generally at the same speed as the moving belt 140. This is depicted in FIG. 7 in which the moving belt 140 travels in direction A, a portion of the first belt 206 travels in direction B (and a returning portion of the belt 206 thus travels in direction C), and a portion of the second belt 208 travels in direction D (and a returning portion of the belt 208 thus travels in direction E).

The portions of the belts 206 and 208 proximate the moving belt 140 are spaced apart from one another and in many applications, converge toward one another as the belts travel toward an exit 212 of the double belt press 200. This dimensional convergence serves to compact or compress the layers of material on the moving belt 140 passing through the press 200. In particular embodiments, the press 200 includes provisions for heating the layers of material.

Double belt presses are known in the art and are commercially available. One such press is commercially available from Hymmen of Germany under the designation ISOPRESS Double Belt Press.

Referring further to FIG. 7, provided downstream of the press exit 212 is a plurality of washing sprayers 220. As described in greater detail herein, the sprayers 220 apply effective amounts of one or more washing fluids to the layered material, and specifically to the particulate material(s). Application of washing fluid(s) to the compressed layered material serves to thermally cool the layered materials and solidify any polymeric material, i.e., polymer material 150. In addition, application of washing fluid(s) may also solubilize, dissolve, and/or wash away the particulate materials 130 in the layered materials.

Generally after and/or during washing via the sprayer(s) 220, the moving belt 140 is collected at a carrier rewind station 230. It will be appreciated that the present subject matter includes an alternative configuration in which the moving belt 140 is a continuous belt, and so a return roller or other comparable equipment is provided in place of the carrier rewind station 230.

After separation from the moving belt 140, the layered material is directed to a fluid tank 240. The fluid tank may contain one or more liquids for washing, solubilizing, and/or dissolving the particulate material(s) from the layered material. In many applications the fluid tank 240 contains water. The layered material is typically immersed in the liquid, e.g., water, contained in the tank 240.

Upon exiting the tank 240, the layered material is dried such as by passing the material along one or more air knives 250. The dried layered material is collected on a collection roller or spool 270 and optionally in conjunction with receipt of a liner 260.

It will be appreciated that the present subject matter includes variations of the system 190 such as systems that include additional process operations or equipment, different process operations or equipment, and/or which do not use some of the components or operations depicted in FIG. 7.

Deposition of a salt layer typically involves salt particles around 10-50 microns in size, depending on desired pore size. Salt is generally compacted after being dispensed. If a salt layer is not compacted, the density is typically undesirably low and the resulting layer has a relatively high amount of voids and air space. Therefore, compaction is typically desired. In many applications, the salt should contact the polymeric film evenly and uniformly so there are no wrinkles or discontinuites in the resulting layer. Covering plates or belts can precompact a salt layer such as for example by use of a double belt press 200 previously described in conjunction with FIG. 7. As previously noted, prior to compaction a salt layer typically has a low density and high void proportion. These characteristics often result in the layer of salt exhibiting a relatively high amount of friction. This can cause the salt to be laterally displaced, e.g. move sideways, during precompaction. If the salt is compacted too quickly, it can cause the salt to move sideways during precompaction. If the salt is compacted too tightly, it can cause the salt to move sideways as well. Therefore, the speed and pressure utilized during compaction of a salt layer are also important. In one aspect of the present subject matter, laterally positioned stationary members or side restrainers are utilized to prevent the salt from moving sideways or otherwise being laterally displaced. Referring to FIG. 7 for example, one or more laterally positioned stationary members or side restrainers 280 can optionally be provided at one or more locations in the system 190. Generally, the side restrainers 280 are positioned along lateral side edges of the moving belt 140 carrying the layered material within the double belt press 200.

Figure 8:
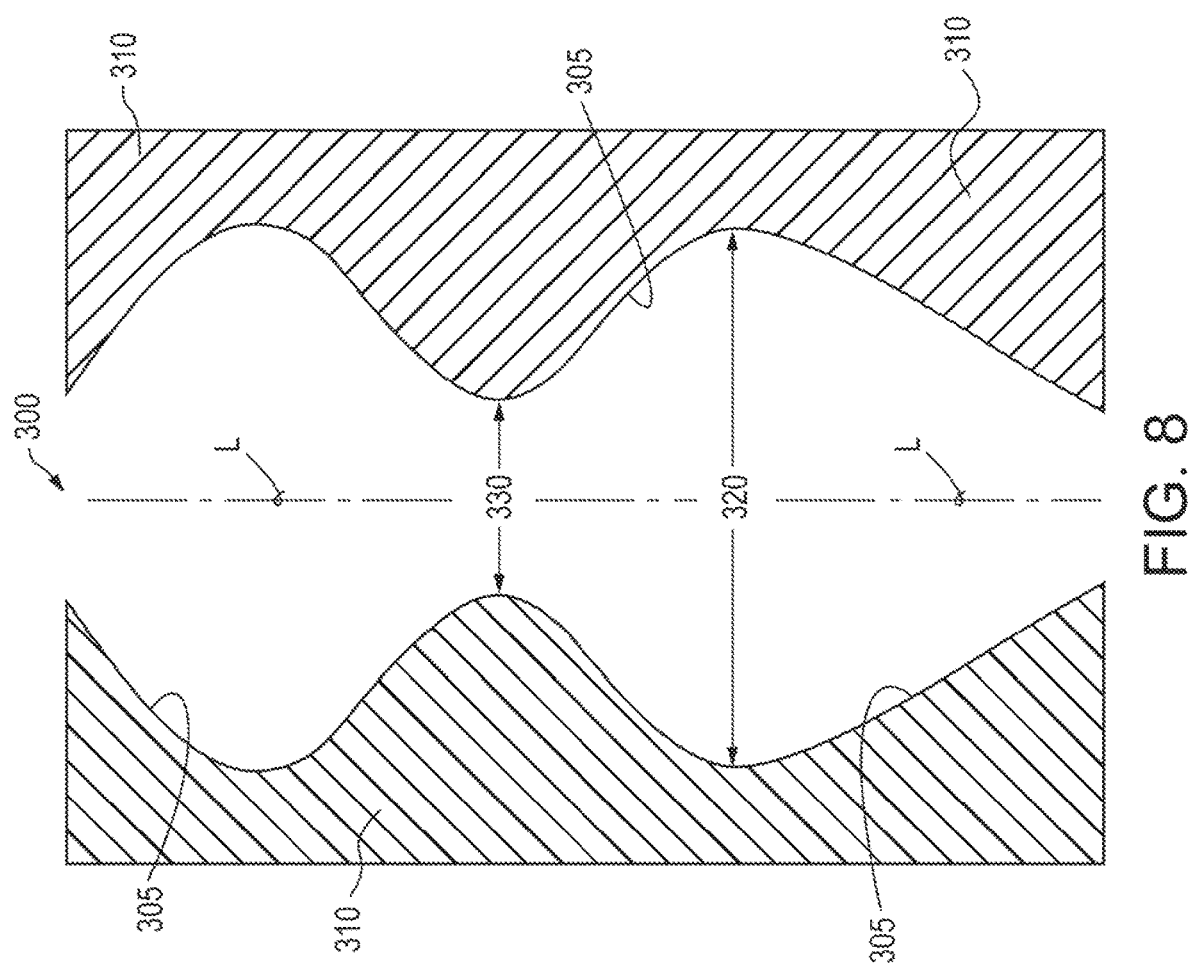
FIG. 8 is a schematic of a pore throat configuration present in certain particulate collections.

In certain applications and particularly when a salt feed source is in the form of relatively large particles, the salt powder is ground into smaller particles. The ground particles are then classified by size such as by sieving techniques to obtain a smaller particle population and/or desired range of particle size. Larger particles can be used for forming larger pores and smaller particles can be used when smaller pore sizes are desired. Referring to FIG. 8, a schematic illustration depicts a typical void or channel 300 defined between regions of polymer 310, such as in a layer of porous polymeric material produced by the system 190 of FIG. 7. The void(s) or channels 300 result from dissolving and/or washing away particulate material previously disposed in the void(s). For example, after depositing salt particles, the salt particles typically contact each other when compacted. During invasion of a flowable material such as a flowable polymer, the polymer fills the gaps or voids between the salt particles. When the salt is washed away, the resulting channels 300 in the polymeric material 310 can be characterized by a pore span 320 or diameter, i.e., the largest dimension taken transverse to a longitudinal axis L of the channel 300; and a pore throat 330 taken transverse to the longitudinal axis L. The pore throats 330 are typically the smallest dimension in the channel 300. The pore spans 320 result from voids where the salt particles were located before being washed away. The pore throats 330 are caused by a lack of polymer filling all the gaps between the salt particles because the polymer is relatively viscous. Typically, a dimensional ratio of about 5:1 to about 7:1 exists between pore spans 320 and pore throats 330 in porous polymeric materials produced in accordance with the subject matter described herein. Thus, for example, if the pores are 10 microns in diameter or span, the narrowest pore throats typically are about 2 microns. Materials having particular dimensional characteristics for pore throats can be used for certain filtration media. If a greater number or extent of passages through the polymeric material are desired, the pressure of polymer administration used during compaction is typically increased. The processing pressure can be increased by increasing the pressure of plates in a double belt press, which will increase permeability, porosity, and throat sizes because there will not be a perfect filling of polymer between the particles.

In another aspect of the present subject matter, the salt particles may be coated with a functional material. After the invasion by polymer, the salt can be washed off or otherwise removed, leaving a porous polymer with the functional coating material. Thus, referring further to FIG. 8 for example, a functional coating material can be deposited at one or more regions along an inner wall 305 of the channel 300.

Particle size distribution can vary so the resulting pore size distribution may also vary. As previously described, after grinding, the powder or particulate matter can be classified or sieved to obtain a smaller range of particle size. Generally, the smaller the size range, the more uniform the pore sizes will be in the final material. Since the polymer will not be able to invade all the gaps or voids between particulates, with inclusion of smaller sized particles in the particulate population, the pore throats may become larger.

Figure 9:
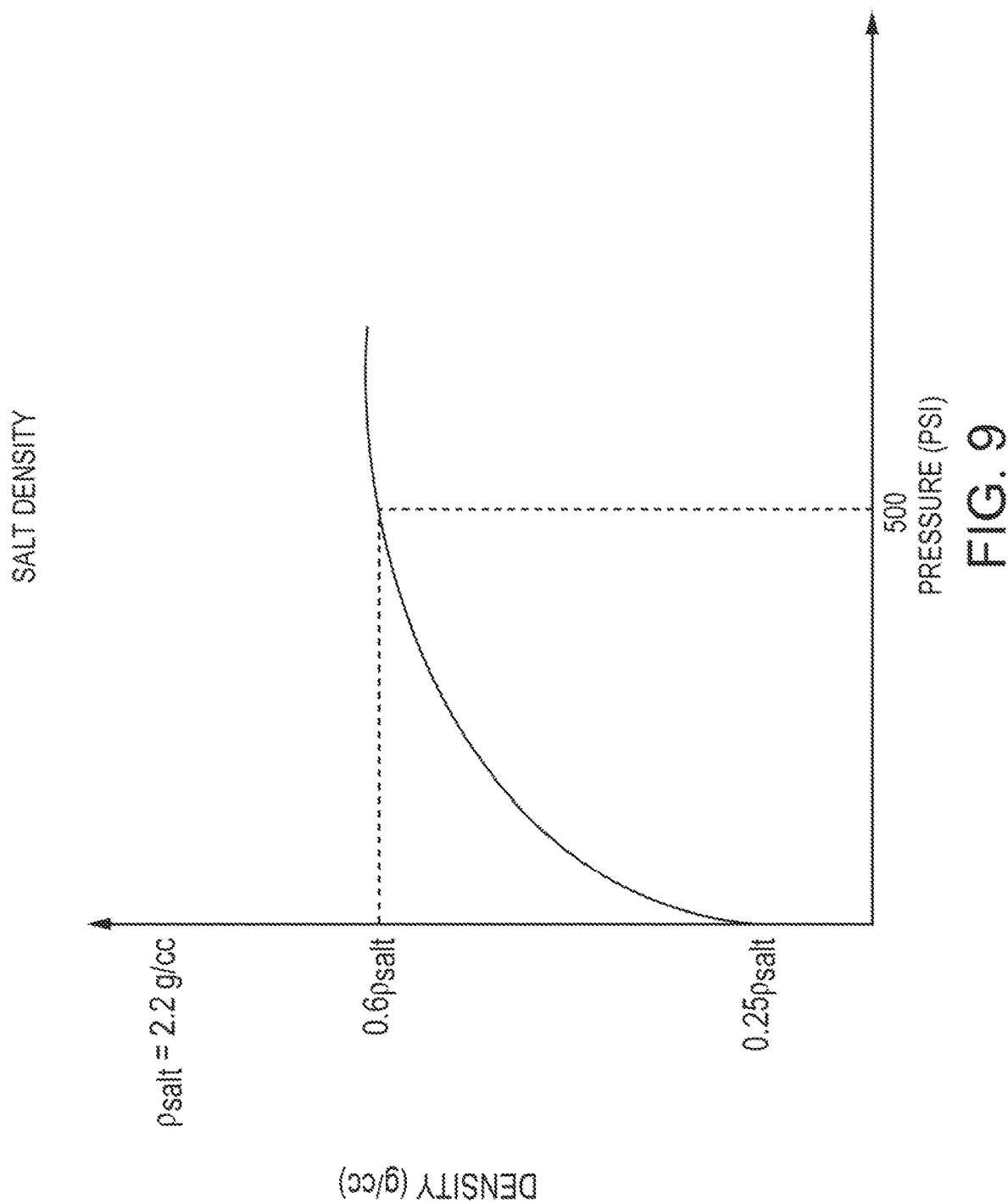
FIG. 9 is a graph of typical density as a function of pressure in certain salt particulates.

As shown in FIG. 9, the density of salt ($\rho_{salt}$) is around 2.2 g/cc. Since prior to compaction, a layer or region of salt powder has a relatively low density and large proportion of voids, and so the density of the layer is significantly less than that of $\rho_{salt}$ because of the air in the voids. Compacting the powder increases the density by eliminating some of the air. The more compacted the salt powder is, the closer the density is to the actual density of salt. For certain embodiments of the present subject matter, using a compaction pressure of about 500 psi, results in a density of the compacted salt layer of about 0.6 $\rho_{salt}$. This should yield approximately 60% porosity in the final material. However, in practice, it has been found that the final porosity is about 80% because the polymer does not fill all the voids in the salt layer.

Figure 10:
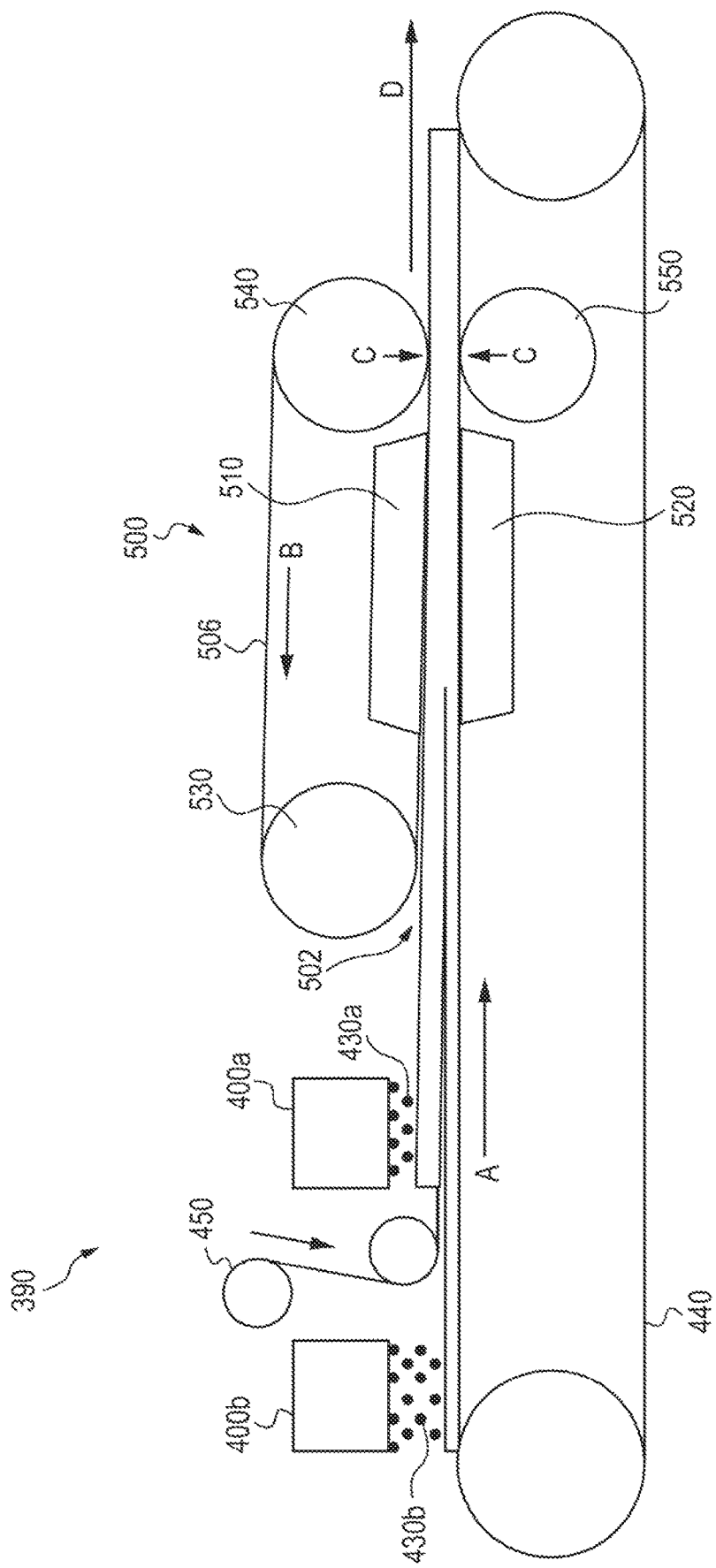
FIG. 10 is a schematic view of another system in accordance with the present subject matter.

As depicted in FIG. 7, a double belt press can be utilized for compacting and heating the salt layer(s) and polymeric film layers. FIG. 10 illustrates another system 390 for forming a layered material or layered material intermediate. The system 390 includes a pair of particulate dispensers such as 400a and 400b. The dispensers 400a, 400b deposit layers of particulate material 430a and 430b, respectively on opposite faces of a thin layer of polymeric material such as dispensed from a wound roll of polymeric film 450. As shown in FIG. 10, the layered material is carried and/or supported by a moving belt displaced in direction A. The layered material is directed to a convergence zone 502 generally located at the entrance of a heating and pressure station 500 as follows. Typically, a continuous belt 506 extending between rollers 530 and 540 is provided downstream of the dispensers 400a, 400b. The first roller 530 upstream of the second roller 540 is spaced a desired distance from the moving belt 440 at the convergence zone 502. Generally, this distance is slightly greater than the total height of the uncompacted layered material. As the moving belt 440 transports the layered material into the heating and pressure station 500, the continuous belt 506 moving in direction B, engages the layered material. The layered material is further transported to one or more heating and pressure components shown as 510 and 520 which are typically included in the station 500. Typically, the heating and pressure components 510 and 520 direct heat and compressive pressure to the layered material to an extent such that the polymeric material, i.e., the polymer film 450, is at least partially melted. In many embodiments, the pressure across the layer(s) is uniform. The heating and pressure components 510 and 520 compact the salt and melt the film. This causes the polymer film to invade the particles. In certain embodiments, the particulates have the potential to move such as move laterally outward in the convergence zone 502, which would cause defects in the material. Therefore, a constant speed is typically maintained. A carrier material, such as paper, or no carrier can be used. The previously described optional side restrainers 280 depicted in FIG. 7 can also be used to reduce the potential for salt to be laterally displaced.

In certain versions of the system 390, an optional supplemental press roller 550 is provided in pressing or compacting arrangement with the second roller 540. The two rollers 540, 550 are positioned along opposite faces of the layered material carried on the moving belt 440. In certain embodiments, the rollers 540 and 550 are spaced apart a predetermined distance which corresponds to a final overall thickness of the layered material. After passing through the rollers 540, 550, the material is transported in the direction D to one or more other operations such as follows. Once the salt and film have been compacted and heated, the resulting layered arrangement cools as it exits the system 390. The layered arrangement slowly cools as it moves along the belt. Once the layered arrangement is cooled, the salt is washed away.

The salt and film are typically washed after cooling. The layered arrangement can be placed in a container where it is sprayed with water on the top and bottom to dissolve all or substantially all of the salt. For relatively thick final products, the material can be immersed in water. When the salt is completely washed away, the final porous material is left to dry.

After washing, the final porous material is placed on an absorbent member and positioned over a funnel or other collection container to allow the water to drain. After about 5-10 minutes of air drying, depending on the thickness, the material is completely dry.

Figure 11:
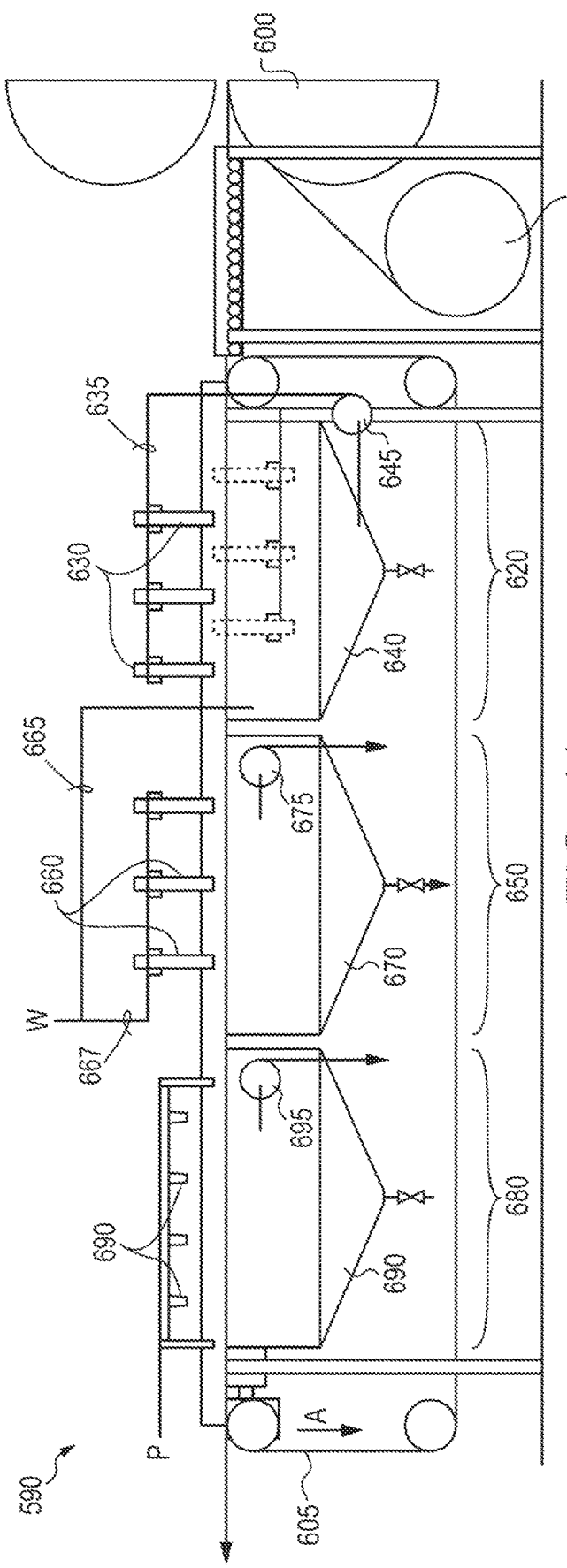
FIG. 11 is a schematic side elevational view of another system in accordance with the present subject matter.
Figure 12:
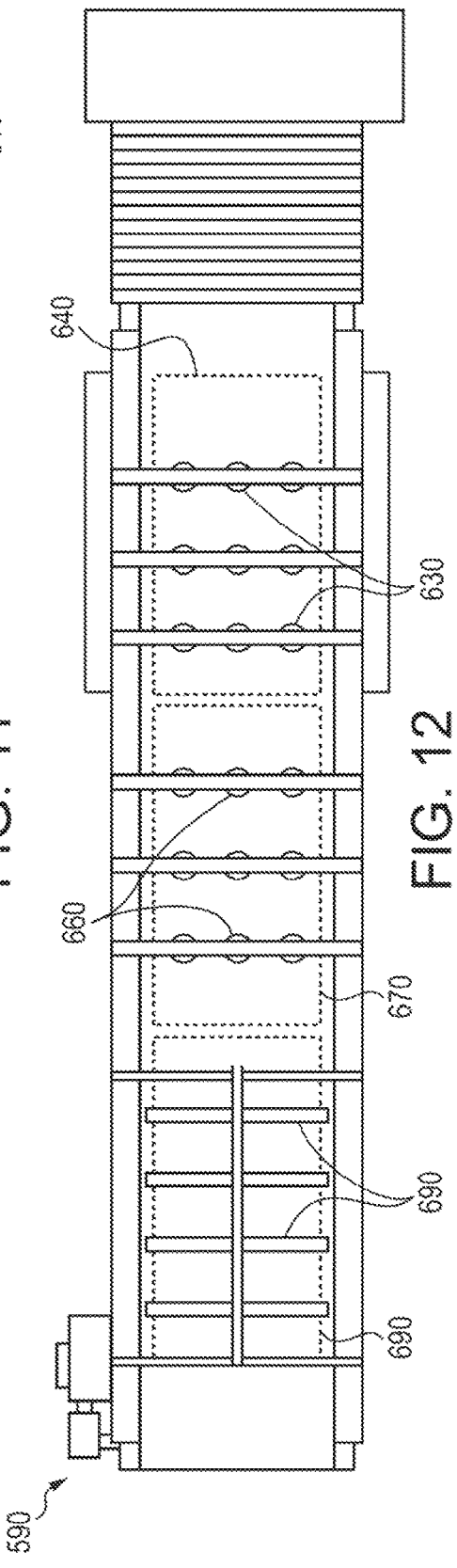
FIG. 12 is a schematic planar top view of the system depicted in FIG. 11.

The present subject matter also provides particular systems for washing and/or drying layered materials, such as layered porous materials or articles as described herein. FIGS. 11 and 12 depict a system 590 for washing and drying a porous layered material such as for example, produced by the system 390 depicted in FIG. 10 or at location 212 in the system 190 depicted in FIG. 7. FIG. 11 is a side elevational view of the system 590 and FIG. 12 is a top planar view of the system 590. Specifically, the system 590 is used in association with a source of layered material to be washed, dried, and/or further processed. In the representative embodiment shown, a wound spool or roll of material is depicted at 600. If a carrier layer is used, a collection spool 610 can be used to collect the carrier prior to feeding the layered material to the system 590. The layered material is carried by a moving belt 605 in the direction of arrow A. The moving belt can be in the form of a mesh web directed to a prewash station generally shown as 620 in FIG. 11. The prewash station 620 includes a plurality of spray nozzles 630 that selectively dispense a washing liquid such as water onto the layered material. Liquid such as water discharged from the nozzles 630 is collected in one or more tanks 640. The nozzles 630 are in flow communication with a conduit 635 for transporting liquid from a source. One or more pumps 645 can be provided to transport liquid from the tank 640 to the nozzles 630.

The layered material, carried on the moving belt 605, is transported from the prewash station 620 to a final wash station shown as 650 in FIG. 11. Another set of nozzles 660 and a conduit 667 with a source W of a wash liquid are provided. The wash liquid may also be directed to the prewash station 620 via a conduit 665. The final wash station 650 includes one or more tanks 670 for collecting wash liquid and one or more vacuum pumps 675 for promoting transfer of liquid from the layered material.

Thus, the system 590 comprises one or more prewash stations disposed upstream which dispense a wash liquid which is recirculated within the prewash station. In such recirculation, a washing liquid is dispensed onto a composite material to thereby solubilize and/or wash away the salt or particulate material. The dispensed washing liquid is collected and can then be re-dispensed onto the composite material. And, the system 590 also comprises one or more final wash stations disposed downstream of the prewash stations that dispense fresh wash liquid. Dispensing fresh wash liquid can be performed in combination with, or instead of, dispensing recirculated wash liquid.

The system 590 also comprises one or more drying stations generally shown as 680. The drying station 680 includes a plurality of air knives 690 or other discharge elements that direct flowing air onto the layered material exiting the final wash station 650. The air knives 690 direct air, and typically compressed air from a source of pressurized air P onto the layered material being conveyed through the drying station 680 by the moving belt 605. The drying station 680 may include one or more tanks 690 for collecting liquid exiting the layered material. And, the drying station 680 may also include one or more vacuum pumps 695 for promoting removal of residual liquid from the layered material.

The present subject matter also provides various processes and techniques for forming shaped particulates having certain interior configurations. For example, the shaped particulates can include fibers, tubes, spheres, and irregular shaped particulates. Moreover, for example, the particulates can have solid interiors or have one or more hollow interior regions. As shown in FIGS. 13-21, a porous fiber or tube having a generally uniform and non-hollow cross section, a porous fiber or tube having an interior hollow region, and a porous fiber or tube having multiple interior hollow regions can be formed as follows. First, the initial fiber or tube is filled or packed with salt powder or other particulates then embedded in more salt powder. The packed fiber or tube is heated and pressed in the salt bed. After cooling, the salt is washed and the material is dried. Once dried, the results are a porous fiber, porous multi-component fiber, or porous tube. Specifically, FIGS. 13-15 schematically depict various stages of forming a porous fiber or tube 720. An initial polymeric fiber or tube 710 is provided. The fiber or tube 710 may be porous or be relatively non-porous. The fiber or tube 710 is contacted with salt particles or other particulate matter 715. In certain applications, the fiber or tube 710 is embedded or immersed in a salt bed. Upon exposure to heat and to a temperature greater than the melting point or at least the softening point of the fiber or tube 710, the polymer material flows within at least a portion of the voids between the particles. After cooling to solidify the polymer and washing away the particulate matter, a porous fiber or tube 720 is produced. FIGS. 16-18 schematically depict various stages of forming a porous fiber or tube 750 having an interior void or hollow region 755. The process for forming the fiber or tube 750 generally corresponds to the previously described technique for forming the porous fiber or tube 720 in regard to FIGS. 13-15. An initial polymeric fiber or tube 730 having an interior hollow region 732 is provided. The fiber or tube 730 is contacted or embedded within particulates 740. Heat is then applied followed by cooling and washing to thereby produce the porous fiber or tube 750. FIGS. 19-21 schematically depict various stages of forming a porous fiber or tube 790 having a plurality of interior voids or hollows 795. The process for forming the fiber or tube 790 generally corresponds to the previously described method for forming the porous fiber or tube 720 shown in FIGS. 13-15. An initial polymeric fiber or tube 760 having a plurality of interior hollow regions 762 is provided. The fiber or tube 760 is contacted or embedded within particulates 780. Heat is then applied followed by cooling and washing to thereby produce the porous fiber or tube 790.

Another method of forming porous tubes is to pack a salt powder in a shrink tube, shrink the packed tube such as by exposure to heat, place the packed tube in a salt powder bed, compress and heat, cool, wash, and then dry the tube. A variation of this method is to pack a salt powder into a tube, and then stretch the tube instead of shrinking the tube, wherein the remaining operations of the method remain the same. In yet another method, two halves of a tube in a salt bed or other collection of particulates are heated and compacted. All of the described methods tend to produce an oval tube shape due to the compacting step. However, the shrink tube and half tube processes may result in final products with the least amount of flattening of the final tube. It will be appreciated that the present subject matter includes a wide array of techniques and processes and is not limited to any of the processes described herein.

Figure 22:
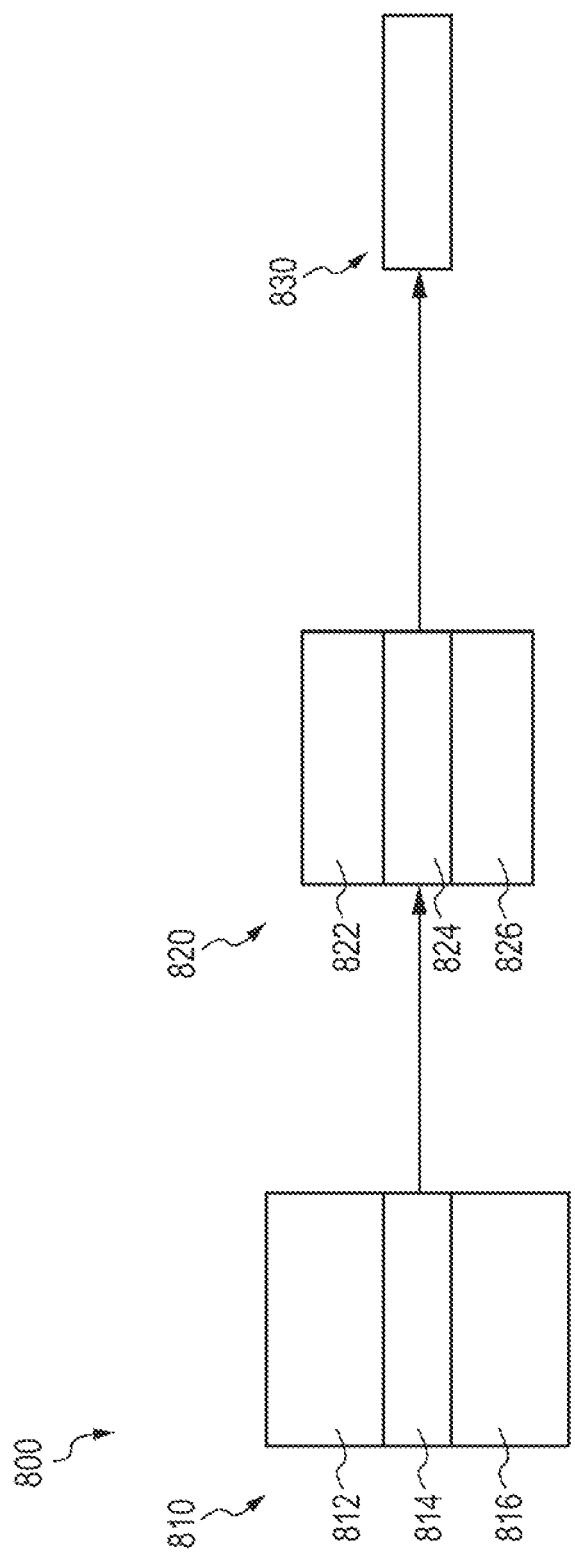
FIG. 22 is a schematic view of another process in accordance with the present subject matter.

In another aspect of the present subject matter, and as depicted in FIG. 22, porous films can also be created using layered arrangements of polymeric particulates. The process is generally as previously described. However, instead of a polymer film, polymer powder is deposited on a first salt or particulate layer. This creates a resulting porous material with increased porosity. With this process, a multiple layered porous film can also be created by layering various powders prior to compaction. Fibers and non-wovens can also be layered or otherwise incorporated to create different levels of porosity. Referring to FIG. 22, a process 800 is depicted using a layered arrangement 810 including a layer 814 of polymeric particulates disposed between an upper layer 812 of salt particles or other particulate matter and a lower layer 816 of salt particles or other particulate matter. The layered arrangement 810 is subjected to heating and compaction or other force application to produce the layered intermediate 820. The heating operation involves heating the layer 814 of polymeric particulates to a temperature greater than the melting point or at least the softening point of the polymer. Application of heat and/or pressure causes compaction of the layered intermediate 820 and flow of polymer from layer 824 into at least a portion of voids between salt particles in layers 822 and/or 826. Compaction may also cause particles from layers 822 and/or 826 to be displaced into the layer 824 of polymeric particulates. The layered arrangement 820 is then cooled to solidify the polymeric material, and washed to thereby remove salt particles or other particulate matter to thereby produce a porous product or article 830.

Another process that can be performed using polymeric particulates is forming a polymer/salt powder blend. The polymer powder can be combined with salt powder prior to deposition on a salt layer. The process is generally as previously described. The final material can be a much more porous material than the materials produced in previously described methods, or more porous as compared to other known porous powders. The resulting porous powder can be used in many applications, such as chromatography column packing material and as paint extender. The greater the ratio of salt to polymer in the blend, the more porous the final material will be after the process has been completed. The two major benefits of combining the salt and polymer powders prior to compaction are increased speed of process and increased porosity. This process may also reduce the production cost and allow a thinner final porous material to be fabricated. In regards to this process, the polymer powder particle size in relation to the salt powder particle size affects the roughness of the surface of the final material. Another possible variation is to combine one or more regions along the interface of adjacent layers with higher porosity materials. Finally, it is also possible to form graded density products. This can be done by depositing a salt layer with a given particle size distribution and vibrating the bed such that the smaller particles in the particle population move towards the bottom. This strategy will create a graded density in the resulting product. From that stage on, the process remains the same as the general methodology described herein.

A variation of the polymer/salt powder blend process could be performed to create a three dimensional or non-layered object by pre-forming the object in a mold, embedding the object in a salt bed, and then heating the embedded object. Once the resulting material arrangement has cooled, the salt can be washed off and the object dried.

Figure 23:
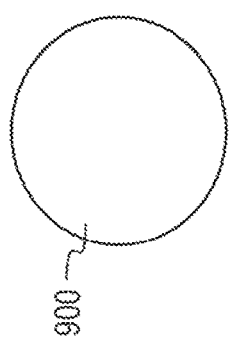
FIGS. 23-25 are schematic views illustrating formation of porous spheres in accordance with the present subject matter.
Figure 24:
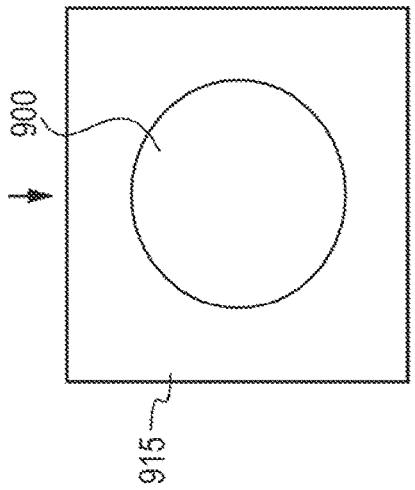
Figure 25:
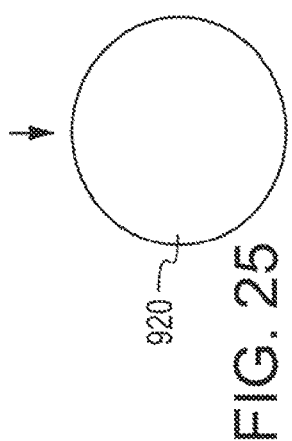
Figure 26:
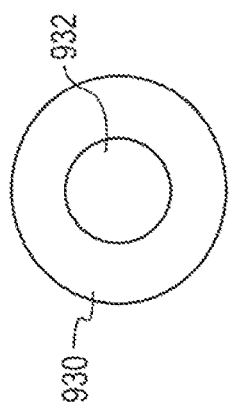
FIGS. 26-28 are schematic views illustrating formation of porous spheres having an interior hollow region in accordance with the present subject matter.
Figure 27:
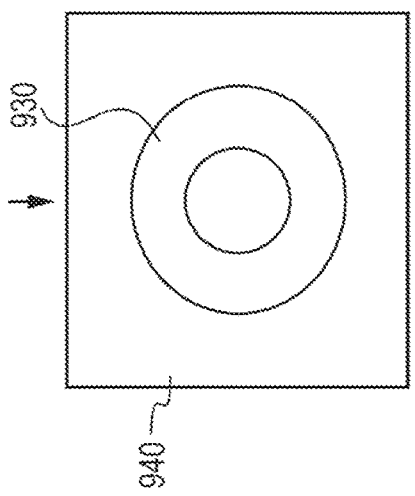
Figure 28:
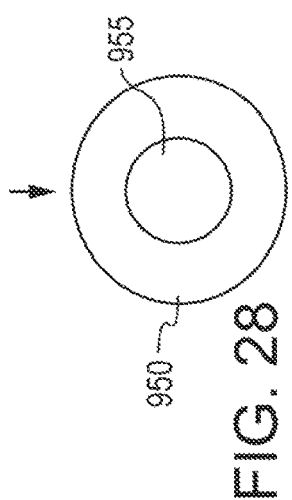
Figure 29:
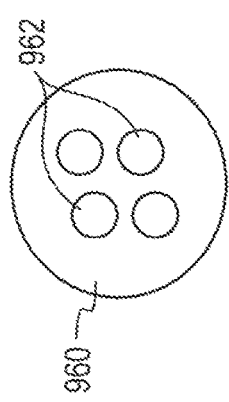
FIGS. 29-31 are schematic views illustrating formation of porous spheres having a plurality of interior hollow regions in accordance with the present subject matter.
Figure 30:
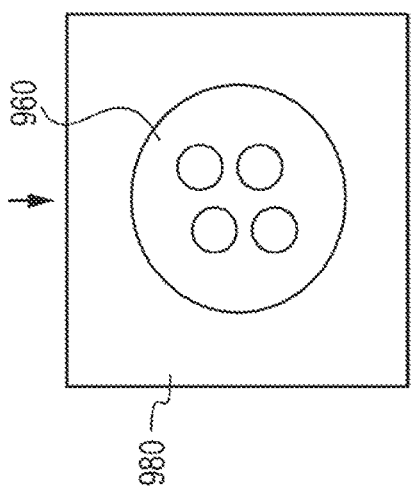
Figure 31:
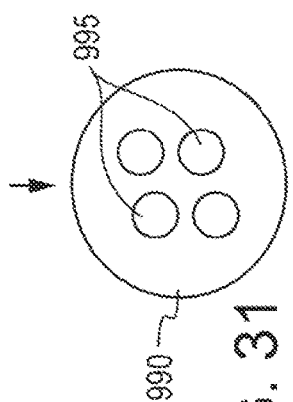

In accordance with yet another aspect of the present subject matter and as shown in FIGS. 23-31, porous spheres may be produced by injecting molten polymer spheres into a salt bed (as generally described herein) or using a mold (as previously described) to create the shape. The spheres would then go through the same process of heating/pressing, cooling, washing, and drying. Specifically, FIGS. 23-25 depict a process for forming porous polymeric spheres 920 having a non-hollow interior. Generally, a polymeric material generally in the form of sphere shaped particles 900 is provided. The particles 900 may be porous, or in the alternative relatively nonporous. The polymeric particles 900 are contacted or otherwise embedded within a salt bed 915 or other particulate collection. Heat and pressure are then applied which is followed by cooling and washing to thereby produce porous polymeric particles 920. The previously noted technique can also be used to form polymeric porous particles 950 having an interior hollow region 955 as depicted in FIGS. 26-28. Specifically, initial spherical hollow particles 930 are provided. The particles 930 define an interior hollow region 932. The particles 930 are contacted or embedded within salt particles 940 or other particulate matter. Heat and pressure are applied followed by cooling and washing to thereby produce porous hollow particles 950. FIGS. 29-31 depict a process for forming porous spherical particles 990 having a plurality of interior hollow regions 995. Generally, a spherical particulate material 960 is provided which includes a collection of interior voids or hollow regions 962. The particulate material 960 is contacted or embedded within a salt bed 980 or other particulate collection and subjected to heat and pressure. Then, the polymeric particulates are cooled and washed to remove salt 980 and thereby produce the porous particulate product 990.

Figure 32:
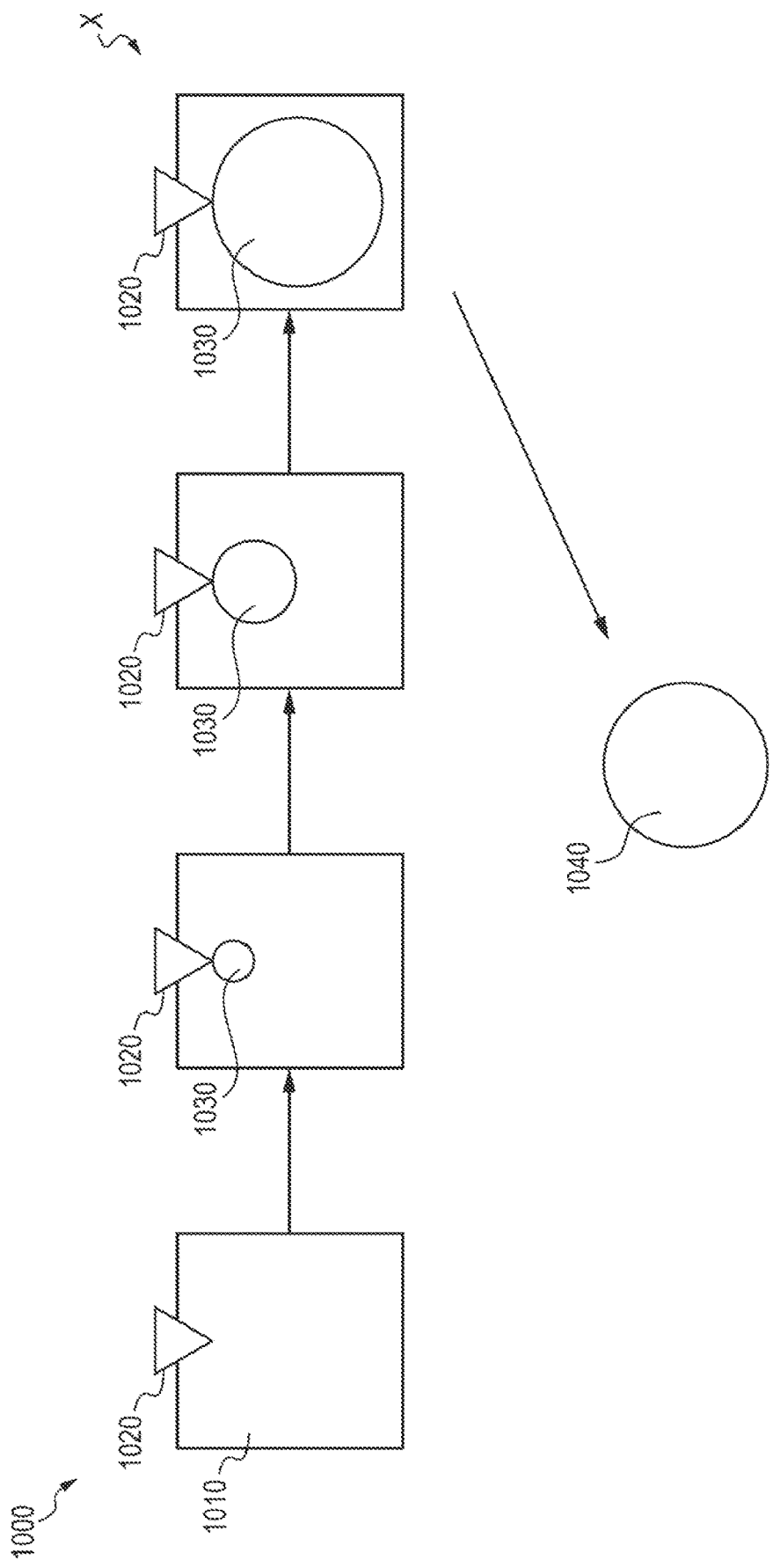
FIG. 32 is a schematic view of another process in accordance with the present subject matter.
Figure 33:
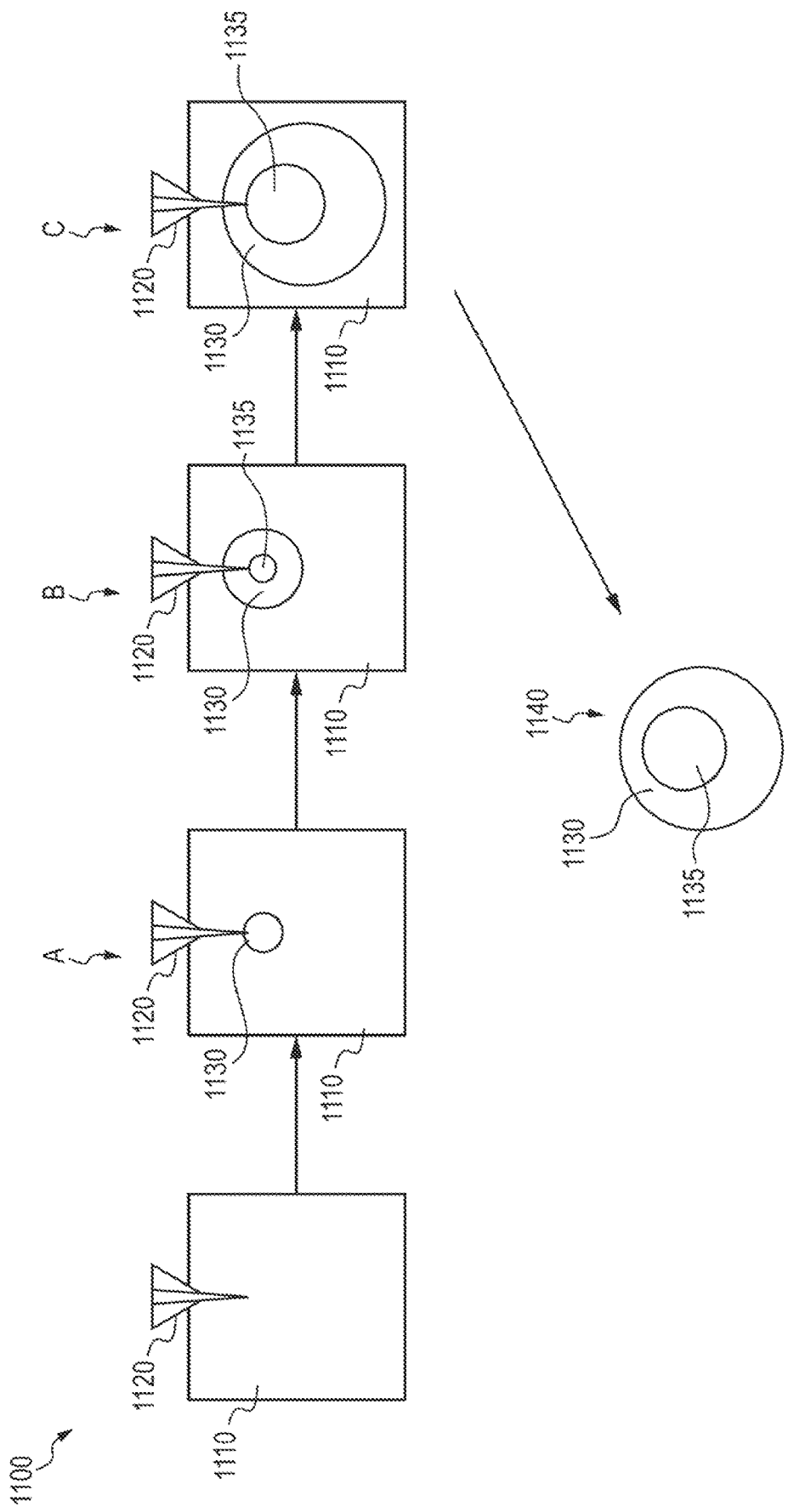
FIG. 33 is a schematic view of another process in accordance with the present subject matter.

FIGS. 32-33 illustrate additional processes for forming polymeric spheres. In these processes, one or more flowable polymeric materials such as molten polymer is injected directly into a salt bed under pressure with an injection port, or via several ports. Once the polymer has cooled, the salt is washed and the final material is dried, thereby producing porous spheres. Referring to FIG. 32, a process 1000 is shown in which a salt bed 1010 or other collection of washable particulates is provided. An injection port and source of polymeric material are collectively shown as 1020. A flowable polymeric material 1030 is injected or otherwise directed into an interior region of the salt bed 1010. As additional amounts of the polymeric material 1030 are injected, the mass or amount of polymeric material increases as shown in FIG. 32. After injection of a desired amount of polymeric material such as shown at stage X of the process 1000, the polymeric material is cooled and removed or otherwise separated from the salt to produce a porous polymeric article or object 1040. Multiple components can also be injected by using the same strategy and then injecting a second substance in the center after a lag time as shown in FIG. 33. This can be done more than once for multiple substances. Specifically, referring to FIG. 33, a process 1100 is depicted for forming a porous multi-component article or object 1140. In process 1100, a salt bed 1110 or other collection of particles is provided. An injection port in communication with at least two different polymeric materials is collectively shown as 1120 and at least partially positioned within the salt bed 1110. A first polymeric material 1130 is injected into the salt bed 1110 as shown at stage A of the process. In stage B, a second polymeric material 1135 is injected into an interior region of the previously deposited material 1130. Additional amounts of the second polymeric material 1135 can be introduced as shown in stage C. After cooling and separation of the polymeric materials 1130, 1135 and salt particles 1110, such as by washing, a porous multi-component polymeric article or object 1140 is thereby produced.

Figure 34:
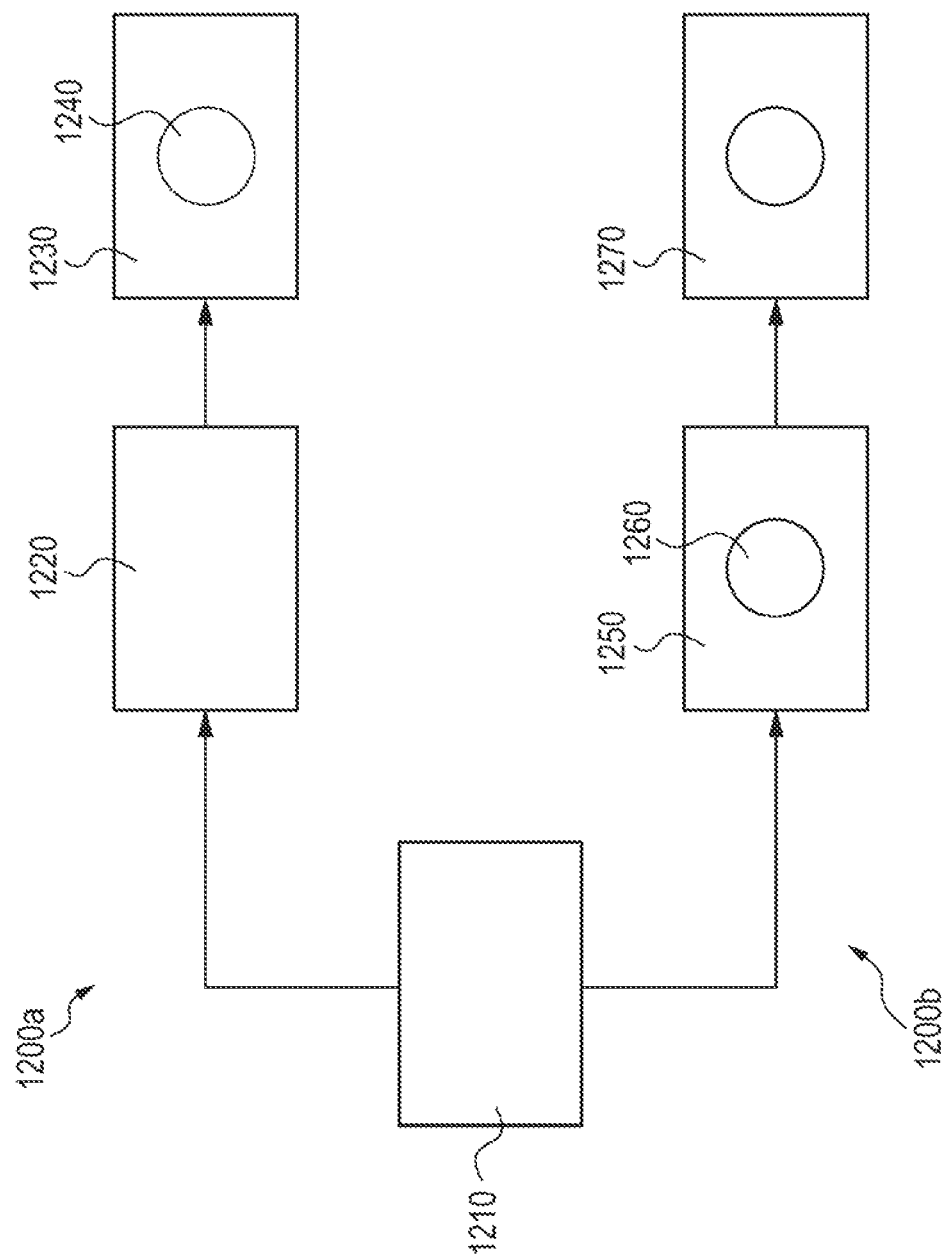
FIG. 34 is a schematic view of another process in accordance with the present subject matter.

FIG. 34 depicts another aspect of the present subject matter. Generally, after producing a layered porous sheet or other thin member, the sheet is subjected to one or more die-cutting operations to form desired shapes or sheets having particular dimensions. In an alternative technique, the order of die-cutting can be reversed or otherwise modified to produce materials with porous edges. When the final material is die-cut after process completion, the edges can become warped and typically exhibit poor quality and/or undesirable porosity characteristics. This can be remedied by die-cutting first and then making the porous material. This will allow the edges of the material to have the same porosity as the rest of the film. Specifically, FIG. 34 illustrates two processes involving formation of a die cut aperture in a layered article. Generally a film material 1210 is provided. In process 1200*a*, one or more salt layers are applied onto the film and then heat and pressure are applied to thereby form an intermediate layered assembly 1220. One or more die-cutting operations are then performed such as in forming an aperture 1240. The resulting die cut intermediate layered assembly 1230 is then subjected to washing or other operation(s) to remove salt. In process 1200*b*, the film material is subjected to one or more die-cutting operations such as in forming an aperture 1260 to thereby form a die cut film layer 1250. Then, one or more salt layers are applied onto the film and then heat and pressure are applied to thereby form an intermediate die cut layered assembly 1270. The intermediate assembly 1270 can be subjected to washing or other operation(s) to remove salt. It will be appreciated that the present subject matter includes various methods and sequences of operations including subjecting a polymer film to one or more die-cutting operations prior to removing or washing away particulate material; prior to heating the film to a temperature sufficient to cause the polymeric material to flow; and/or prior to contacting the film with a layer or region of particulate material.

An alternative option for deposition can be performed using three layers of slurries-salt, polymer, and then another salt layer. The polymer dries slower than the salt slurry, so that material will invade more easily, which could eliminate the need for pressure to be applied. In that situation, the heat from the nip may be sufficient to completely dry the final material. Fibers could be inserted into this slurry if needed. The slurry could be formed into a cake using tape casting. This would require less drying because the fabric would absorb the solvent. Other options include having solutions instead of slurries. The salt would crystallize as the polymer powder melted, which would cause the polymer to penetrate the salt layer. The polymer could also be in an isopropyl alcohol (IPA) solution. The salt would precipitate when in contact with IPA and would cause the polymer to invade the salt as it crystallized. Crystallization may also be induced by using solvents or non-solvents.

It may be possible to granulate hot salt with polymer powder that is the same or similar to the material that is to be made porous. The polymer would either be incorporated into the final material or removed during the washing step. This would create a high quality porous film with no extra material present.

The present subject matter provides a porous polymeric film or porous polymeric particulates or other articles produced by any of the methods or techniques described herein. The porous polymeric particulates can be in a wide array of shapes, sizes, and configurations. In certain versions, the porous particulates are in the form of fibers or tubes, or spheres, or other geometrical shapes. The porous particulates can have non-hollow interiors, a single interior hollow region, and/or multiple interior hollow regions. In certain embodiments, the various processes described herein can be used to produce (i) porous fibers or tubes having a non-hollow interior, (ii) porous fibers or tubes having an interior hollow region, (iii) porous fibers or tubes having a plurality of interior hollow regions, (iv) porous spheres having a non-hollow interior, (v) porous spheres having a hollow interior region, (vi) porous spheres having a plurality of interior hollow regions, and (vii) combinations of (i)-(vi).

As previously noted, it is also contemplated that the salt particles may be coated with a functional material. After the invasion by polymer, the salt can be washed off, leaving the porous polymer with a functional coating material.

Many other benefits will no doubt become apparent from future application and development of this technology.

All patents, applications, and articles noted herein are hereby incorporated by reference in their entirety.

As described hereinabove, the present subject matter overcomes many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A system for dispensing particulates in a layer onto a substrate, the system comprising:
   a mesh frame including a screen extending between a frame assembly, the screen defining a plurality of apertures;
   provisions for producing vibratory motion, the provisions being in vibratory communication with the mesh frame;
   at least one spacer fixed in position between the mesh frame and the substrate on which particulates are to be dispensed when the system is in operation, the at least one spacer having dimensions corresponding to the desired thickness of the layer of particulates to be dispensed on the substrate,
   wherein the provisions for producing vibratory motion include a spring apparatus having at least one support bar and a plurality of tensioned springs, wherein upon contact and/or displacement of the springs relative to the mesh frame, vibratory movement is transferred to the screen of the mesh frame.

2. The system of claim 1 wherein the provisions for producing vibratory motion include a particulate feeder engaged to a vibrating blade, wherein the vibrating blade contacts the mesh frame and transfers vibratory movement to the screen of the mesh frame.

3. A system for dispensing particulates in a layer onto a substrate, the system comprising:
   a mesh frame including a screen extending between a frame assembly, the screen defining a plurality of apertures; provisions for producing vibratory motion, the provisions being in vibratory communication with the mesh frame; at least one spacer positioned between the mesh frame and the substrate on which particulates are to be dispensed, the at least one spacer having dimensions corresponding to the desired thickness of the layer of particulates to be dispensed on the substrate, wherein the provisions for producing vibratory motion include a spring apparatus having at least one support bar and a plurality of tensioned springs, wherein upon contact and/or displacement of the springs relative to the mesh frame, vibratory movement is transferred to the screen of the mesh frame.

4. A system for dispensing particulates in a layer onto a substrate, the system comprising:
   a mesh frame including a screen extending between a frame assembly, the screen defining a plurality of apertures;
   provisions for producing vibratory motion, the provisions being in vibratory communication with the mesh frame;

at is in operation, the at least one spacer having dimensions corresponding to the desired thickness least one spacer fixed in position between the mesh frame and the substrate on which particulates are to be dispensed when the system of the layer of particulates to be dispensed on the substrate, wherein the at least one spacer is replaceable with a thinner or thicker one when a thinner or thicker layer of particulates is desired, wherein the at least one spacer is positioned under each corner of the mesh frame.

* * * * *